(12) United States Patent
Hsieh et al.

(10) Patent No.: US 9,948,854 B2
(45) Date of Patent: Apr. 17, 2018

(54) ELECTRONIC DEVICE, IMAGING SYSTEM AND CONTROL METHOD THEREOF FOR DUAL LENS SHOOTING

(71) Applicant: Wistron Corporation, New Taipei (TW)

(72) Inventors: Sheng-Shien Hsieh, New Taipei (TW); Hsiao-Chang Lin, New Taipei (TW); Tzu-Yao Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 81 days.

(21) Appl. No.: 14/992,019

(22) Filed: Jan. 11, 2016

(65) Prior Publication Data

US 2017/0111568 A1 Apr. 20, 2017

(30) Foreign Application Priority Data

Oct. 14, 2015 (TW) .............................. 104133610 A

(51) Int. Cl.
*H04N 5/232* (2006.01)
*H04N 5/225* (2006.01)

(52) U.S. Cl.
CPC ....... *H04N 5/23216* (2013.01); *H04N 5/2252* (2013.01); *H04N 5/2254* (2013.01); *H04N 5/2257* (2013.01)

(58) Field of Classification Search
CPC ............. H04N 5/23216; H04N 5/2252; H04N 5/2254; H04N 5/2257
See application file for complete search history.

(56) References Cited

U.S. PATENT DOCUMENTS

| 6,731,952 | B2 | 5/2004 | Schaeffer et al. | |
| 6,812,958 | B1* | 11/2004 | Silvester | G06F 1/1607 348/207.1 |
| 7,672,582 | B2* | 3/2010 | Chang | G03B 17/02 348/373 |
| 8,279,544 | B1* | 10/2012 | O'Neill | G02B 7/14 359/819 |
| 9,438,784 | B2* | 9/2016 | Endo | H04N 5/23203 |
| 9,503,625 | B2* | 11/2016 | Oliveira | H04N 5/232 |
| 9,596,770 | B2* | 3/2017 | Gao | H01R 35/04 |
| 2004/0041911 | A1* | 3/2004 | Odagiri | G06F 1/1632 348/207.1 |

(Continued)

OTHER PUBLICATIONS

"Office Action of Taiwan Counterpart Application" with partial English translation, dated Jun. 6, 2016, p. 1-p. 6.

*Primary Examiner* — Nicholas G Giles
(74) *Attorney, Agent, or Firm* — JCIPRNET

(57) ABSTRACT

An imaging device adapted to be detachably disposed on an electronic device is provided. The imaging device includes a shell, an imaging module, a communication module and a touch element. The shell has a first surface and a second surface opposite to each other. The imaging module having a lens is disposed inside of the shell, and the lens is exposed on the first surface of the shell. The communication module is disposed in the shell and an end of the communication module is signally connected to the imaging module. The touch element is connected to the shell and movably contacts a sensing unit of the electronic device. Moreover, an imaging system and a control method thereof are also provided.

20 Claims, 15 Drawing Sheets

(56) References Cited

U.S. PATENT DOCUMENTS

| | | | | |
|---|---|---|---|---|
| 2013/0178245 A1* | 7/2013 | Kulas | ........... | H04M 1/0254 |
| | | | | 455/556.1 |
| 2013/0331148 A1* | 12/2013 | Brough | ........... | G06F 1/1632 |
| | | | | 455/557 |
| 2014/0132781 A1* | 5/2014 | Adams | ........... | H04N 5/2254 |
| | | | | 348/207.1 |
| 2014/0300809 A1* | 10/2014 | Oliveira | ........... | H04N 5/232 |
| | | | | 348/376 |
| 2016/0006934 A1* | 1/2016 | Eromaki | ........... | G02B 15/10 |
| | | | | 348/360 |

\* cited by examiner

ELECTRONIC DEVICE, IMAGING SYSTEM AND CONTROL METHOD THEREOF FOR DUAL LENS SHOOTING

CROSS-REFERENCE TO RELATED APPLICATION

This application claims the priority benefit of Taiwan application serial no. 104133610, filed on Oct. 14, 2015. The entirety of the above-mentioned patent application is hereby incorporated by reference herein and made a part of this specification.

BACKGROUND OF THE INVENTION

Field of the Invention

The invention relates to an imaging device and an imaging system, and particularly relates to an imaging device and an imaging system suitable for dual lens shooting.

Description of Related Art

Along with the development of technology, various smart touch devices such as table personal computers (PC), smart phones, etc., have become indispensable tools in people's daily life. Imaging quality of a camera lens carried by a high-class smart touch device can be comparable with or even superior to a conventional camera. Besides specifications of ten million pixels, a large aperture, vibration reduction, dual lens, etc., some of the high-class smart touch devices further have pixels and image quality similar to that of a single-lens camera.

In order to obtain an image with good quality, in the high-class smart touch device, the dual lens is generally embedded at a same side of the touch device for capturing a three-dimensional (3D) image with high quality or an image with a depth of field. However, configuration of the dual lens generally increases a manufacturing cost of the whole device. Meanwhile, if a user of a low-class smart touch device wants to achieve a dual lens effect similar to that of the high-class smart touch device, the user has to pay a high price to purchase the high-class smart touch device configured with the dual lens, and cannot directly perform function expansion or upgrade on the existing device.

SUMMARY OF THE INVENTION

The invention is directed to an imaging device, which is detachably disposed on an electronic device, so as to implement dual lens shooting by simultaneously using the lenses of the imaging device and the electronic device.

The invention is directed to an imaging system, in which an imaging device is inserted into or connected to an electronic device, and the imaging system is adapted to simultaneously operate the imaging device and the electronic device to perform dual lens shooting.

The invention is directed to a method for controlling an imaging system, by which a touch element contacts a sensing unit of an electronic device to generate a touch signal, and it automatically determined to activate a lens of the electronic device corresponding to the imaging device.

The invention provides an imaging device adapted to be detachably disposed on an electronic device. The electronic device has a touch screen. The imaging device includes a shell, an imaging module, a communication module and a touch element. The shell has a first surface and a second surface opposite to each other. The imaging module is disposed in the shell and has a lens, and the lens is exposed on the first surface of the shell. The communication module is disposed on the shell, and an end of the communication module is signally connected to the imaging module. The touch element is connected to the shell and movably contacts a sensing unit of the electronic device.

The invention provides an imaging system including an electronic device and an imaging device. The electronic device includes a device body, a sensing unit, a front lens and a back lens. The device body has a sensing surface, and the sensing unit is disposed on the sensing surface. The front lens is disposed at a same side of the electronic device with the sensing surface, and the back lens is disposed at another side of the electronic device opposite to the sensing surface. The imaging device is detachably disposed on the electronic device. The imaging device includes a shell, an imaging module, a communication module and a touch element. The shell has a first surface and a second surface opposite to each other. The imaging module is disposed in the shell and has a lens, and the lens is exposed on the first surface of the shell. The communication module is disposed on the shell, and is signally connected to the imaging module and the electronic device. The touch element is connected to the shell and movably contacts the sensing unit. The electronic device determines whether the touch element contacts the sensing unit, and selectively activates one of the front lens and the back lens. An image is captured through the activated one of the front lens and the back lens and the lens of the imaging module.

The invention provides a method for controlling an imaging device, which is adapted to an electronic device. The electronic device has a sensing unit, a front lens and a back lens. The imaging device has an imaging module and a touch element, and the imaging module has a lens. The method includes following steps. It is determined whether the imaging device is connected to the electronic device. After the imaging device is connected to the electronic device, it is determined whether the touch element contacts the sensing unit, so as to selectively activate one of the front lens and the back lens. An image is captured through the activated one of the front lens and the back lens and the lens of the imaging module.

In an embodiment of the invention, the touch element is disposed on the first surface, and the electronic device determines whether the touch element contacts the sensing unit, so as to selectively activate one of the front lens and the back lens.

In an embodiment of the invention, the touch element is disposed on the second surface, and the electronic device determines whether the touch element contacts the sensing unit, so as to selectively activate one of the front lens and the back lens.

In an embodiment of the invention, another end of the communication module is signally connected to the electronic device.

In an embodiment of the invention, the imaging device further includes a fixing member. The fixing member is connected to the shell of the imaging device, and is detachably inserted in the electronic device.

In an embodiment of the invention, the imaging device further includes a clamping structure. The clamping structure is connected to the shell, and detachably clamps on the electronic device. The clamping structure includes the touch element and a fixing member. The touch element and the fixing member are commonly connected to the shell.

In an embodiment of the invention, the touch element is a light-shielding element, and the light-shielding element is configured to shield or reflect light entering the electronic device.

In an embodiment of the invention, the imaging device further include a rotation member, where the rotation member is disposed between the shell and the communication module, and the rotation member drives the shell to rotate relative to the electronic device.

In an embodiment of the invention, the touch element includes an adjusting portion and a touch portion. The adjusting portion is connected to the shell, and the touch portion movably contacts the electronic device through the adjusting portion.

In an embodiment of the invention, the adjusting portion is composed of a flexible material or a soft material.

In an embodiment of the invention, the touch element includes a fixed portion, a pivot portion and a pivot axis. The fixed portion is connected to the shell, and the pivot portion is pivoted to the fixed portion through the pivot axis.

In an embodiment of the invention, the communication module has a wired communication module, and the wired communication module includes a micro universal serial bus (Micro USB) or a universal serial bus (USB). The communication module is detachably connected to the electronic device.

In an embodiment of the invention, the communication module is a wireless communication module. The wireless communication module includes a WiFi communication module or a bluetooth communication module.

In an embodiment of the invention, the electronic device is a smart phone or a tablet personal computer.

In an embodiment of the invention, the sensing unit is a touch panel. The touch element is disposed on the imaging device at a side opposite to the lens of the imaging module. The step of determining whether the touch element contacts the touch panel to selectively activate one of the front lens and the back lens includes following steps. The back lens of the electronic device is activated when the touch element contacts the touch panel. The front lens of the electronic device is activated when the touch element does not contact the touch panel.

In an embodiment of the invention, the method further includes determining whether a time for the touch element contacting the sensing unit is greater than a predetermined time set by the electronic device.

In an embodiment of the invention, the sensing unit is a proximity sensor, and the touch element is a light-shielding element. The touch element is disposed on the imaging device at a side opposite to the lens of the imaging module. The step of determining whether the touch element contacts the proximity sensor to selectively activate one of the front lens and the back lens includes following steps. The back lens is activated when the light-shielding element shields the proximity sensor. The front lens is activated when the light-shielding element does not shield the proximity sensor.

In an embodiment of the invention, the sensing unit is the front lens or the back lens of the electronic device, and the method further includes following steps. The back lens is activated when the touch element shields the front lens of the electronic device. The front lens is activated when the touch element shields the back lens of the electronic device.

According to the above description, the imaging device of the invention is adapted to be installed on the electronic device, and the electronic device is used in collaboration with the lens of the imaging device to form the imaging system suitable for dual lens shooting. Therefore, by installing the imaging device, the electronic device with the single lens may achieve a dual lens shooting effect. Moreover, according to the method for controlling the imaging system of the invention, the electronic device may automatically determine and activate the front lens or the back lens corresponding to a lens direction of the lens of the imaging device, so as to automatically capture an image through the dual lens.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
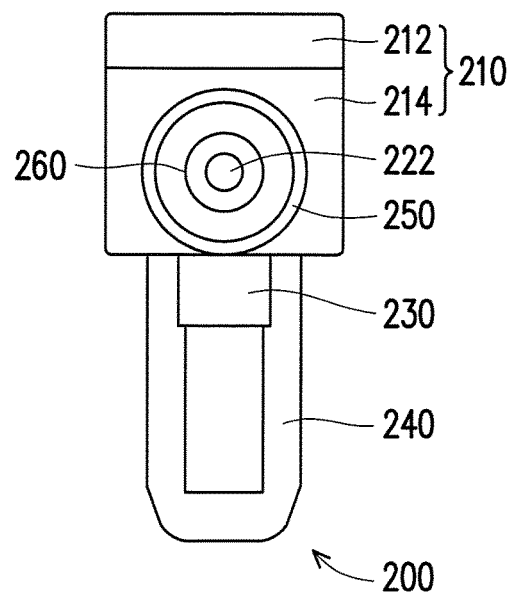
FIG. 1A is a schematic diagram of an imaging device according to an embodiment of the invention.
Figure 1B:
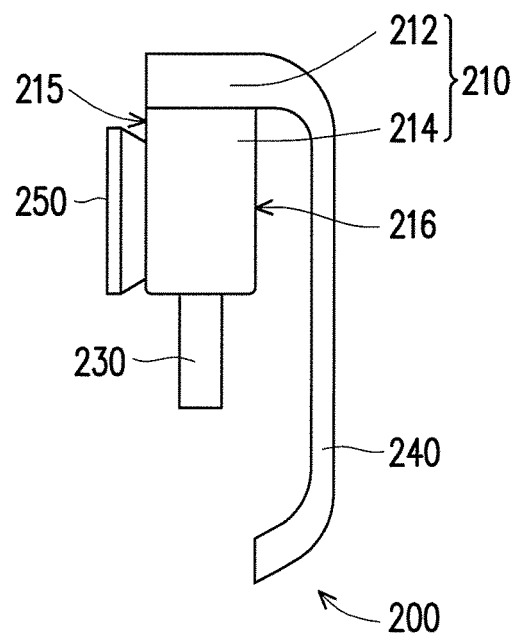
FIG. 1B is a side view of the imaging device of FIG. 1A.
Figure 2:
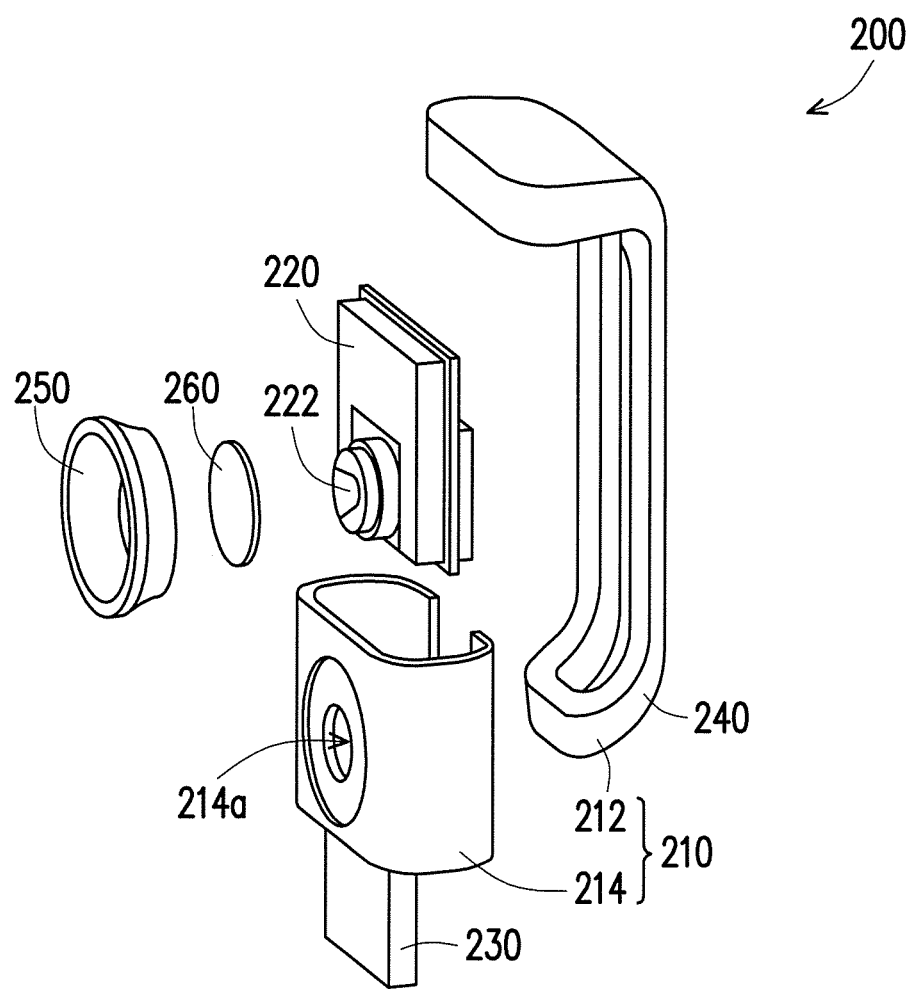
FIG. 2 is an exploded view of the imaging device of FIG. 1A.

FIG. 1A is a schematic diagram of an imaging device according to an embodiment of the invention. FIG. 1B is a side view of the imaging device of FIG. 1A. FIG. 2 is an exploded view of the imaging device of FIG. 1A. Referring to FIG. 1A, FIG. 1B and FIG. 2, in the present embodiment, the imaging device 200 includes a shell 210, an imaging module 220, a communication module 230 and a touch element 240. The shell 210 has a first surface 215 and a second surface 216 opposite to each other, and the shell 210 includes an upper shell 212 and a lower shell 214. The imaging module 220 is disposed in the lower shell 214 and has a lens 222. Moreover, the upper shell 212 covers the top of the lower shell 214. The first surface 215 has an opening 214a, and the lens 222 of the imaging module 220 is exposed on the first surface 215 of the shell 210 through the opening 214a. Moreover, the imaging device 200 further has a lens holder 250 and a protection lens 260. The lens holder 250 surrounds and fixes the protection lens 260 on the first surface 215 of the shell 210, so as to cover and protect the lens 222 of the imaging module 220 exposed on the first surface 215 of the shell 210.

The communication module 230 is disposed on the shell 210, and the communication module 230 is signally connected to the imaging module 220. The communication module 230 of the present embodiment is a micro universal serial bus (micro USB) module or a USB module. Moreover, the touch element 240 is connected to the upper shell 212. The touch element 240 is, for example, a conductive element, a light-shielding/reflecting element or a sound wave absorbing element. In the present embodiment, the imaging device 200 may adopt a suitable type of the touch element 240 according to the type of the electronic device.

Figure 3A:
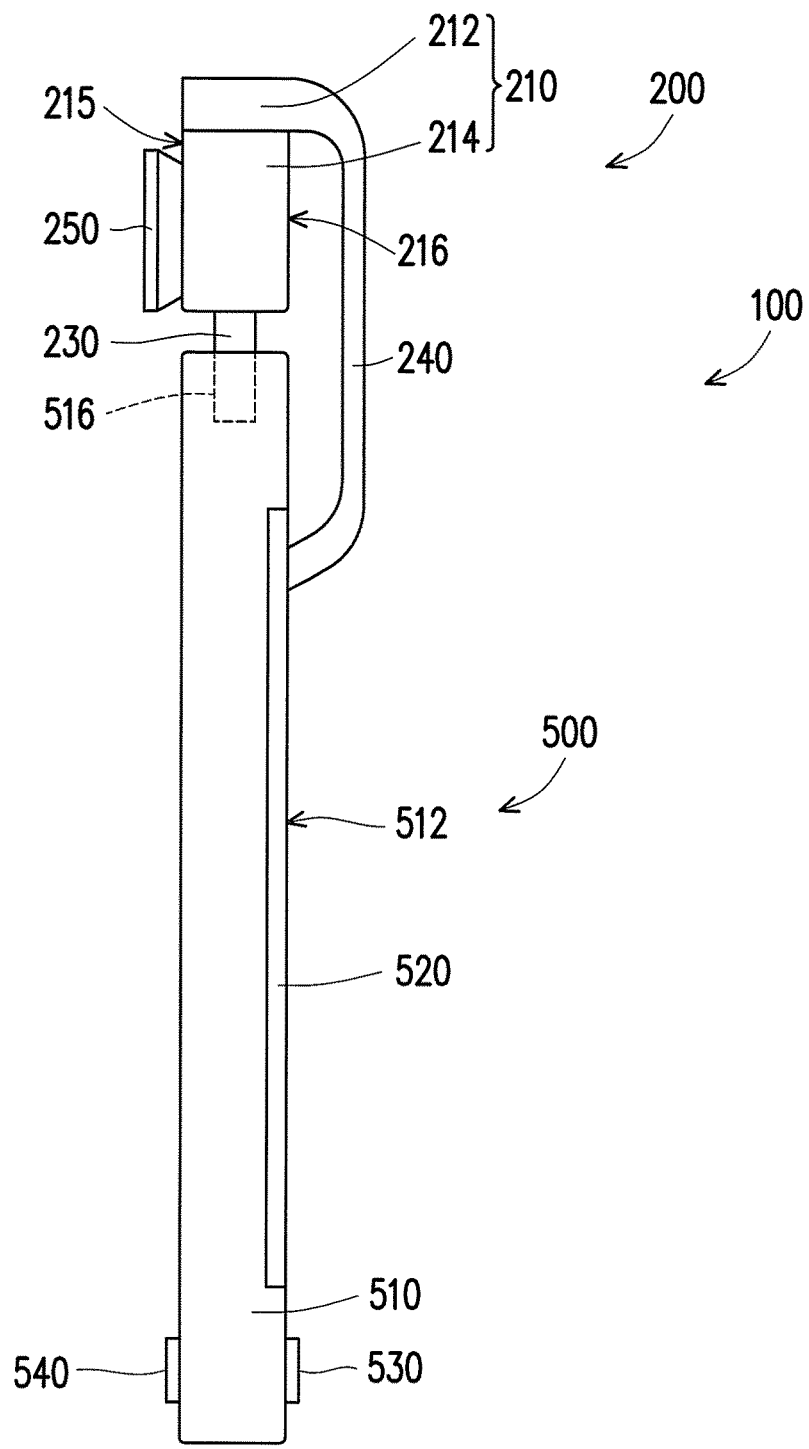
FIG. 3A and FIG. 3B are schematic diagrams illustrating implementations of an imaging system according to an embodiment of the invention.
Figure 3B:
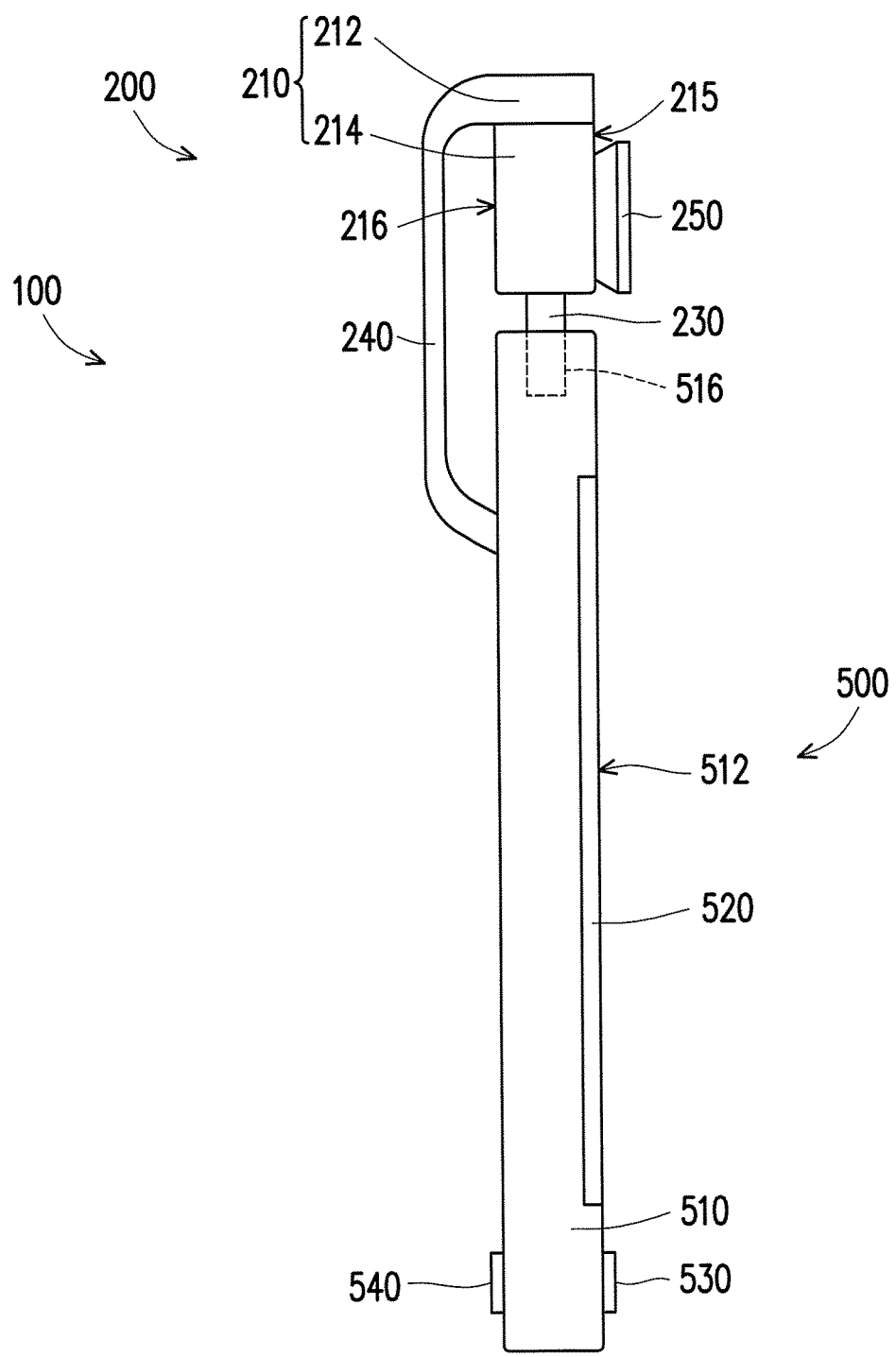

FIG. 3A and FIG. 3B are schematic diagrams illustrating implementations of an imaging system according to an embodiment of the invention. Referring to FIG. 3A and FIG. 3B, in the present embodiment, the electronic device 500 has a connection port 516, and the imaging device 200 is detachably disposed in the connection port 516 of the electronic device 500 through the communication module 230 to form the imaging system 100. In the present embodiment, the connection port 516 is, for example, a micro USB connection port or a USB connection port. Moreover, the electronic device 500 of the present embodiment further includes a device body 510, a sensing unit 520, a front lens 530 and a back lens 540. In the present embodiment, the electronic device 500 can be a touch device, which is, for example, a smart phone or a tablet PC, etc. Moreover, the device body 510 of the electronic device 500 has a sensing surface 512, and the sensing unit 520 is disposed on the sensing surface 512. The sensing unit 520 of the present embodiment is, for example, a touch panel.

The front lens 530 of the electronic device 500 is disposed at a side of the electronic device 500 the same with the side of the sensing surface 512, and the front lens 530 is configured adjacent to the sensing unit 520. The back lens 540 is disposed at another side of the electronic device 500 opposite to the side of the sensing surface 512. Moreover, applications can be built in the electronic device 500 of the present embodiment (not shown), and a user may operate the imaging system 100 through the applications of the electronic device 500.

As shown in FIG. 3A, the imaging device 200 is inserted into the connection port 516 of the electronic device 500 in a manner that the second surface 216 of the shell 210 and the sensing surface 512 are located at the same side of the electronic device 500. Namely, the lens 222 of the imaging device 220 and the back lens 540 of the electronic device 500 have a same lens direction, and are all located at the side of the electronic device 500 opposite to the side of the sensing surface 512. Therefore, the touch element 240 connected to the second surface 216 of the shell 210 can contact the sensing unit 520 configured on the sensing surface 512. The sensing unit 520 senses and receives a signal generated when the touch element 240 contacts the sensing unit 520. When the sensing unit 520 receives the signal, the electronic device 500 determines that the lens 222 of the imaging device 200 and the back lens 540 have the same lens direction. The electronic device 500 then activates the back lens 540, and the lens 222 and the back lens 540 commonly capture an image at the side opposite to that of the sensing surface 512 in a dual lens shooting manner. In the present embodiment, the lens 222 of the imaging device 200 and the back lens 540 may obtain a high quality three-dimensional (3D) image with a depth of field in the dual lens shooting manner.

In the present embodiment, when the sensing unit 520 is a touch panel, and when the touch element 240 contacts the sensing unit 520, in order to avoid confusing a touch signal generated due to the contact of the touch element 240 and the sensing unit 520 and a touch signal generated when the user contacts the sensing unit 520 through a finger or a stylus, the electronic device 500 can be set to identify the touch signal generated due to the contact of the touch element 240 and the sensing unit 520 according to a touch time or a shape of touch points. For example, when the touch element 240 contacts the sensing unit 520, compared to a short and discontinuous touch time corresponding to the finger or the stylus, the touch element 240 contacts the sensing unit 520 at a same position in a continuous and long time. Therefore, the electronic device 500 may set a specific predetermined time to serve as a reference for identifying the touch signal. For example, when a time that the electronic device 500 detects the touch signal is greater than the predetermined time, the electronic device 500 determines that the touch signal is the touch signal generated due to the contact of the touch element 240 and the sensing unit 520. Moreover, the touch element 240 can also be set to contact the sensing unit 520 in multiple touch points, and the touch points can be arranged in a triangle or a rectangle. Compared to a single touch point corresponding to the finger or the stylus or irregular shape arrangement of the touch points, the electronic device 500 may easily identify the touch signal generated due to contact the touch element 240 and the sensing unit 520 according to the number and a shape of the touch points, so as to avoid an interference of external noise.

As shown in FIG. 3B, the imaging device 200 is inserted into the connection port 516 of the electronic device 500 in a manner that the first surface 215 thereof and the sensing surface 512 are located at the same side of the electronic device 500. Moreover, the lens 222 of the imaging module 220 exposed on the first surface 215 of the imaging device 200 and the front lens 530 of the electronic device 500 have the same lens direction, and are all located at the same side of the electronic device 500 with the sensing surface 512. Therefore, the touch element 240 connected to the second surface 216 of the shell 210 cannot contact the sensing unit 520 of the electronic device 500. Therefore, the electronic device 500 does not receive the touch signal coming from the sensing unit 520. Therefore, when the imaging device 200 is inserted into the connection port 516 of the electronic device 500, and the electronic device 500 does not receive the touch signal, the electronic device 500 determines that the lens 222 of the imaging device 200 and the front lens 530 have the same lens direction. Now, the electronic device 500 may activate the front lens 530, and the lens 222 of the imaging module 220 and the front lens 530 commonly capture an image at the side of the sensing surface 512 in the dual lens shooting manner. In this way, the lens 222 of the imaging device 200 and the back lens 540 may obtain a high quality 3D image with a depth of field in the dual lens shooting manner, and can also implement a self-portrait mode through the dual lens.

In the embodiment of FIG. 3A and FIG. 3B, the situation that the touch element 240 is disposed on the second surface 216 of the shell 210 is taken as an example for description. Therefore, when the electronic device 500 detects the touch signal generated due to the contact of the touch element 240 and the sensing unit 520, it represents that the lens 222 of the imaging module 220 and the back lens 540 of the electronic device 500 have the same lens direction. Moreover, when the electronic device 500 does not detect the touch signal, it represents that the lens 222 of the imaging module 220 and the front lens 530 of the electronic device 500 have the same lens direction.

However, in another embodiment of the invention that is not illustrated, the touch element 240 of the imaging device 200 can also be configured on the first surface 215 of the shell 210, i.e., located at the same side with the lens 222 of the imaging lens 220. Therefore, in the present embodiment, when the electronic device 500 detects the touch signal, it represents that the lens 222 of the imaging module 220 and the front lens 530 of the electronic device 500 have the same lens direction. Moreover, when the electronic device 500 does not detect the touch signal, it represents that the lens 222 of the imaging module 220 and the back lens 540 of the electronic device 500 have the same lens direction. A relative configuration relationship between the touch element 240 and the lens 222 of the imaging module 220 is not limited by the invention.

Figure 4A:
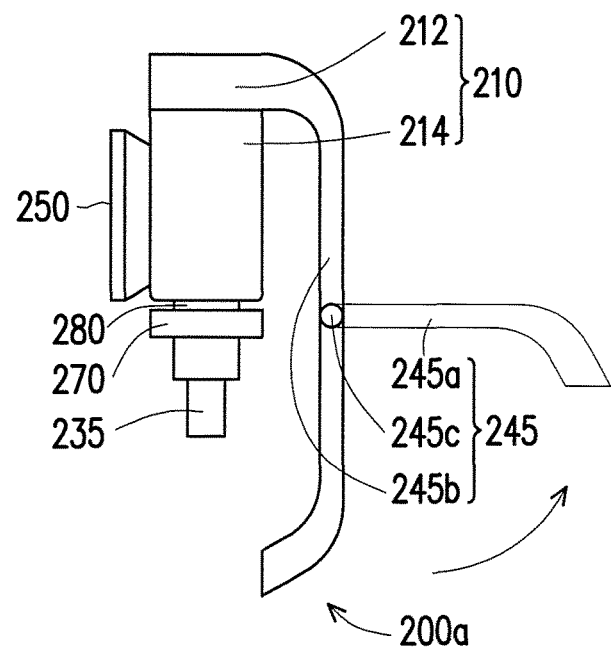
FIG. 4A is a schematic diagram of an imaging device according to another embodiment of the invention.

FIG. 4A is a schematic diagram of an imaging device according to another embodiment of the invention. Referring to FIG. 4A, a difference between the present embodiment and the aforementioned embodiment is that compared to the imaging device 200, the imaging device 200a of the present embodiment further includes a rotation member 270 and a communication module 235. The rotation member 270 is disposed between the shell 210 and the communication module 235. In the present embodiment, the communication module 235 is, for example, a micro USB module, and the rotation member 270 can be a pivot axis. Moreover, an O-shape ring 280 can be disposed between the rotation member 270 and the shell 210 to serve as a buffer between the rotation member 270 and the shell 210. Through the configuration of the rotation member 270, the imaging device 200a can make the imaging module 220 in the shell 210 to pivotally rotate relative to the communication module 235. Therefore, when the communication module 235 is inserted into the electronic device 500, the imaging device 200a may rotate relative to the electronic device 500. Therefore, when the user wants to change the lens direction of the imaging device 200a, the user may control the image device 200a to rotate relative to the electronic device 500. Particularly, when the communication module 235 is only adapted to be inserted into the connection port 516 of the electronic device 500 unidirectionally, the imaging device 200a can be driven by the rotation member 270 to rotate relative to the communication module 235, such that the lens direction of the imaging device 200a can be selectively aligned with the front lens 530 or the back lens 540 of the electronic device 500 to implement dual lens shooting.

In the present embodiment, the imaging device 200a may have a touch element 245, and the touch element 245 includes a pivot portion 245a, a fixed portion 245b and a pivot axis 245c. The fixed portion 245b is connected to the upper shell 212, and the pivot portion 245a is pivoted to the fixed portion 245b through the pivot axis 245c. Therefore, when the imaging device 200a is rotated relative to the communication module 235 through the rotation member 270, the pivot portion 245a can be pivotally rotated upward along an arrow direction of FIG. 4A, so as to avoid a situation that the touch element 245 interferes the device body 510 of the electronic device 500 during the rotation process of the imaging device 200a to block the rotation of the imaging device 200a.

Figure 4B:
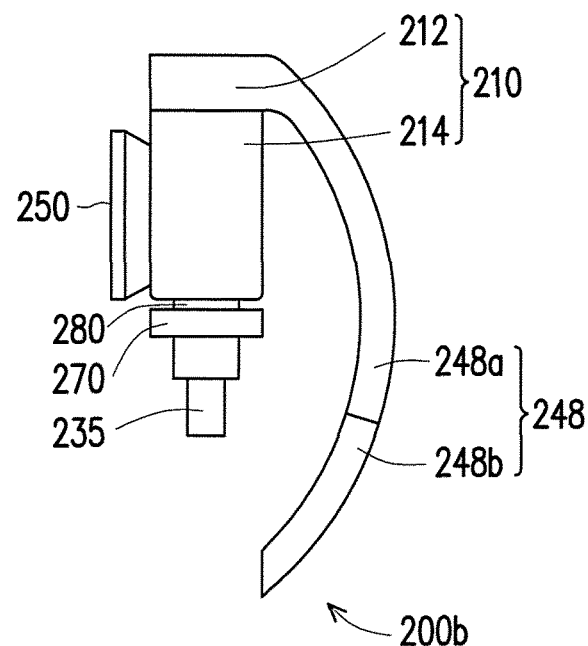
FIG. 4B is a schematic diagram of an imaging device according to another embodiment of the invention.

FIG. 4B is a schematic diagram of an imaging device according to another embodiment of the invention. Referring to FIG. 4B, a difference between the imaging device 200b of FIG. 4B and the imaging device 200a of FIG. 4A is that the imaging device 200b has a touch element 248, and the touch element 248 has an adjusting portion 248a and a touch portion 248b. The adjusting portion 248a is connected to the upper shell 112, and the touch portion 248b is connected to the adjusting portion 248a. In the present embodiment, the adjusting portion 248a is, for example, composed of a flexible material such as rubber, etc. Therefore, the adjusting portion 248a can be stretched/retracted or bended relative to the shell 210, and the touch portion 248b can be moved to a proper touch position relative to the sensing unit 520 along with adjustment of the adjusting portion 248a. For example, when the imaging device 200b is inserted into the electronic device 500, the adjusting portion 248a may adjust the touch portion 248b to a position suitable for contacting the sensing unit 520. Moreover, when the imaging device 200b rotates relative to the electronic device 500 through the rotation member 270, the touch element 248 can be avoided to interfere with the device body 510 through stretching/retracting or bending of the adjusting portion 248a, so as to avoid blocking the rotation of the imaging device 200b.

Moreover, by configuring the adjusting portion 248a, when the imaging device 200b is installed to the electronic device 500 with a different thickness, the touch element 248 can make the touch portion 248b to effectively contact the sensing unit 520 based on stretching/retracting and adjustment of the touch element 248. For example, when the imaging device 200 is installed on the electronic device 500 with a thinner thickness, the adjusting portion 248a can make the touch portion 248b to contact the electronic device 500 in case of no bending or slight bending of the adjusting portion 248a. Comparatively, when the imaging device 200 is installed on the electronic device 500 with a thicker thickness, the adjusting portion 248a has to have a larger curvature to make the touch portion 248b to contact the electronic device 500.

Figure 5A:
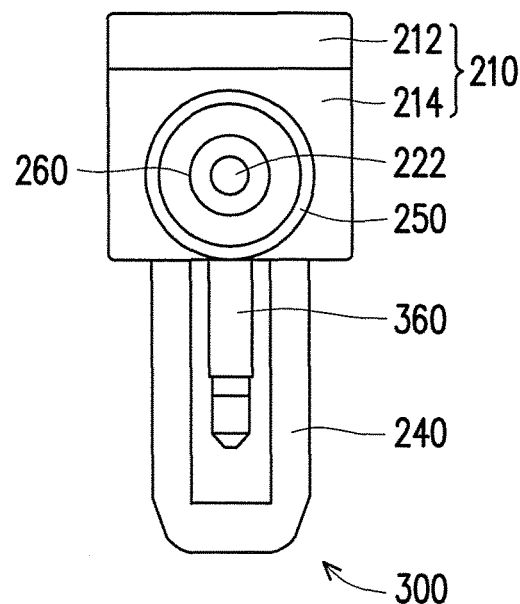
FIG. 5A is a schematic diagram of an imaging device according to another embodiment of the invention.
Figure 5B:
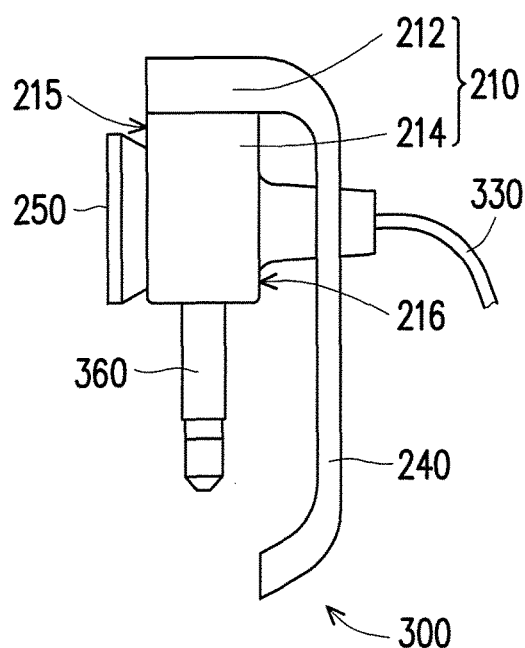
FIG. 5B is a side view of the imaging device of FIG. 5A.
Figure 6:
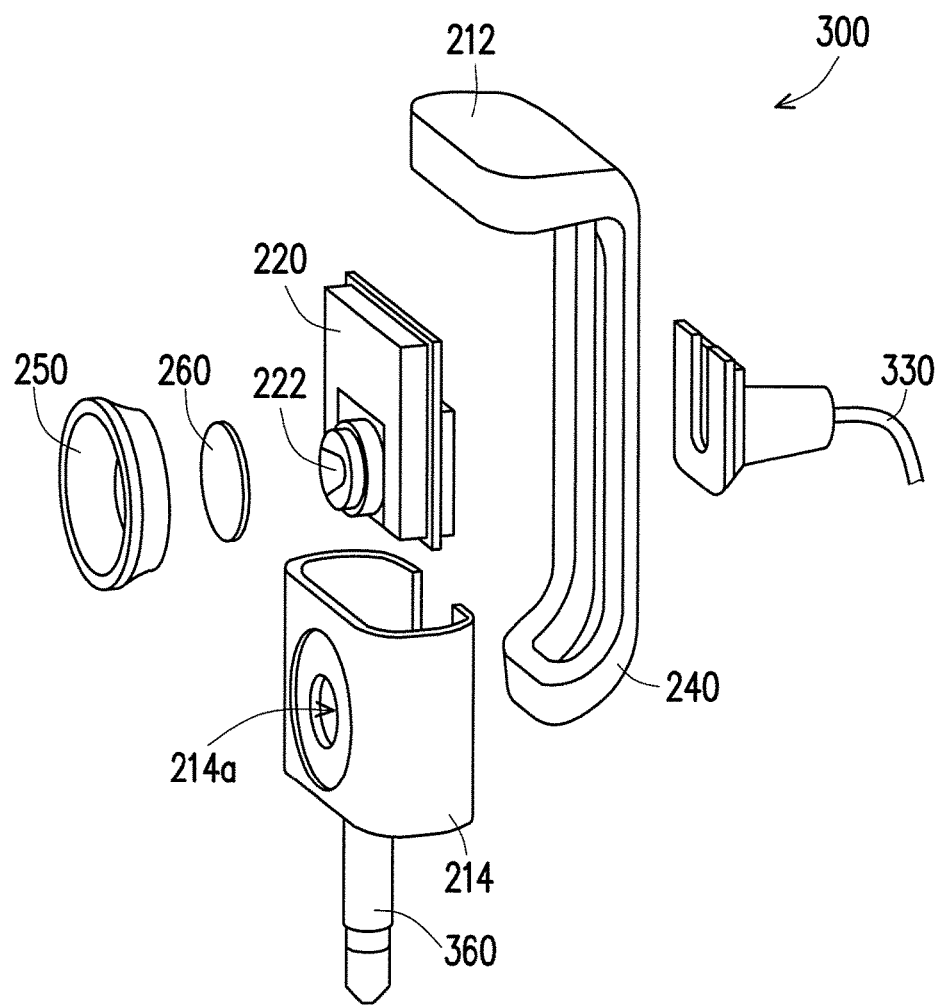
FIG. 6 is an exploded view of the imaging device of FIG. 5A.

FIG. 5A is a schematic diagram of an imaging device according to another embodiment of the invention. FIG. 5B is a side view of the imaging device of FIG. 5A. FIG. 6 is an exploded view of the imaging device of FIG. 5A. Referring to FIG. 5A, FIG. 5B and FIG. 6, in the present embodiment, the imaging device 300 has a similar structure with that of the imaging device 200 of FIG. 1A. Therefore, the same or similar components are denoted by the same or similar referential numbers, and detailed descriptions thereof are not repeated. A difference between the imaging device 300 and the imaging device 200 is that the imaging device 300 has a communication module 330, and one end of the communication module 330 is signally/wired connected to the imaging module 220, and another end of the communication module 330 is signally connected to the electronic device 500. In the present embodiment, the communication module 330 is connected to the second surface 216 of the shell 210, and the communication module 330 is, for example, a wired communication module, for example, the aforementioned micro USB or USB. Therefore, the imaging device 300 of the present embodiment is additionally configured with a fixing member 360 for fixing the imaging device 300 on the electronic device 500.

Figure 7A:
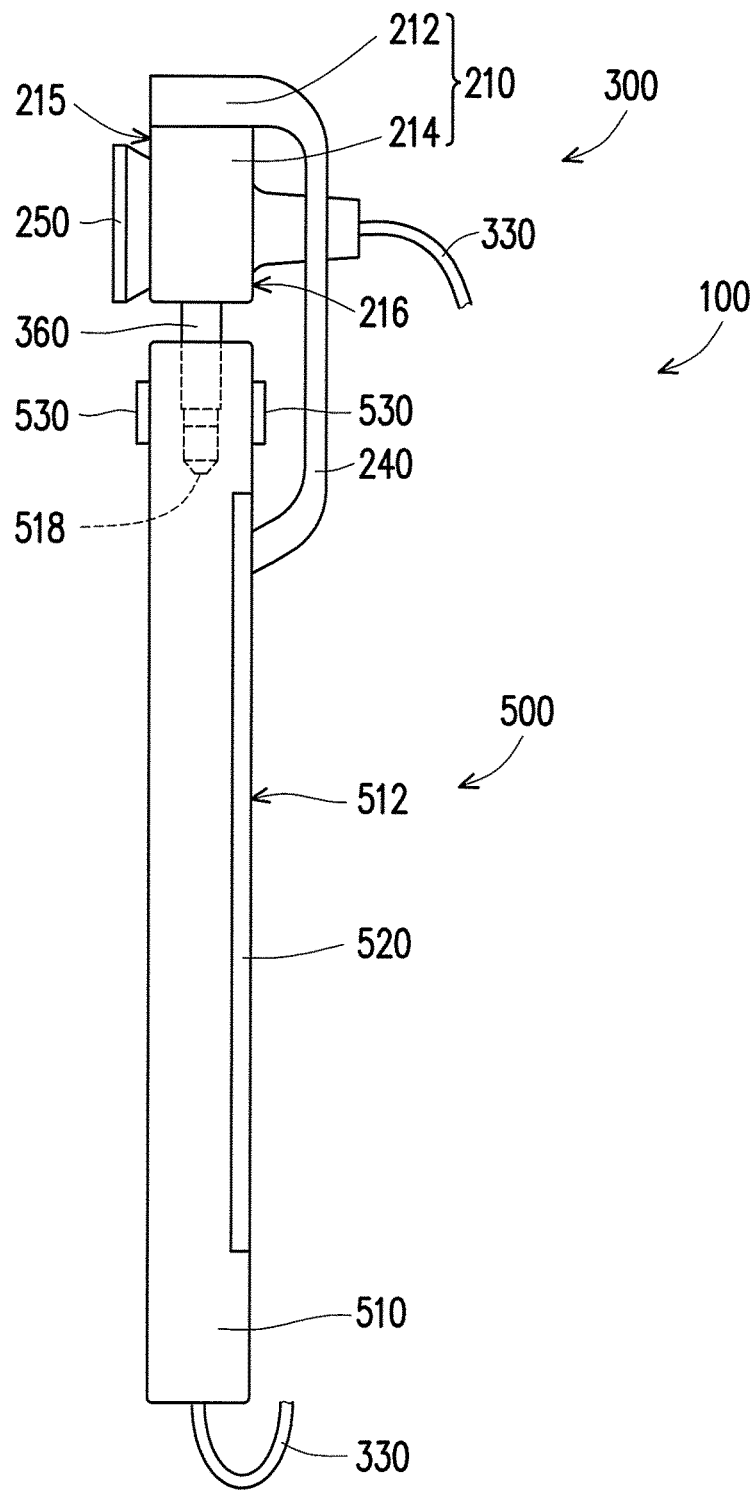
FIG. 7A and FIG. 7B are schematic diagrams illustrating implementations of an imaging system according to another embodiment of the invention.
Figure 7B:
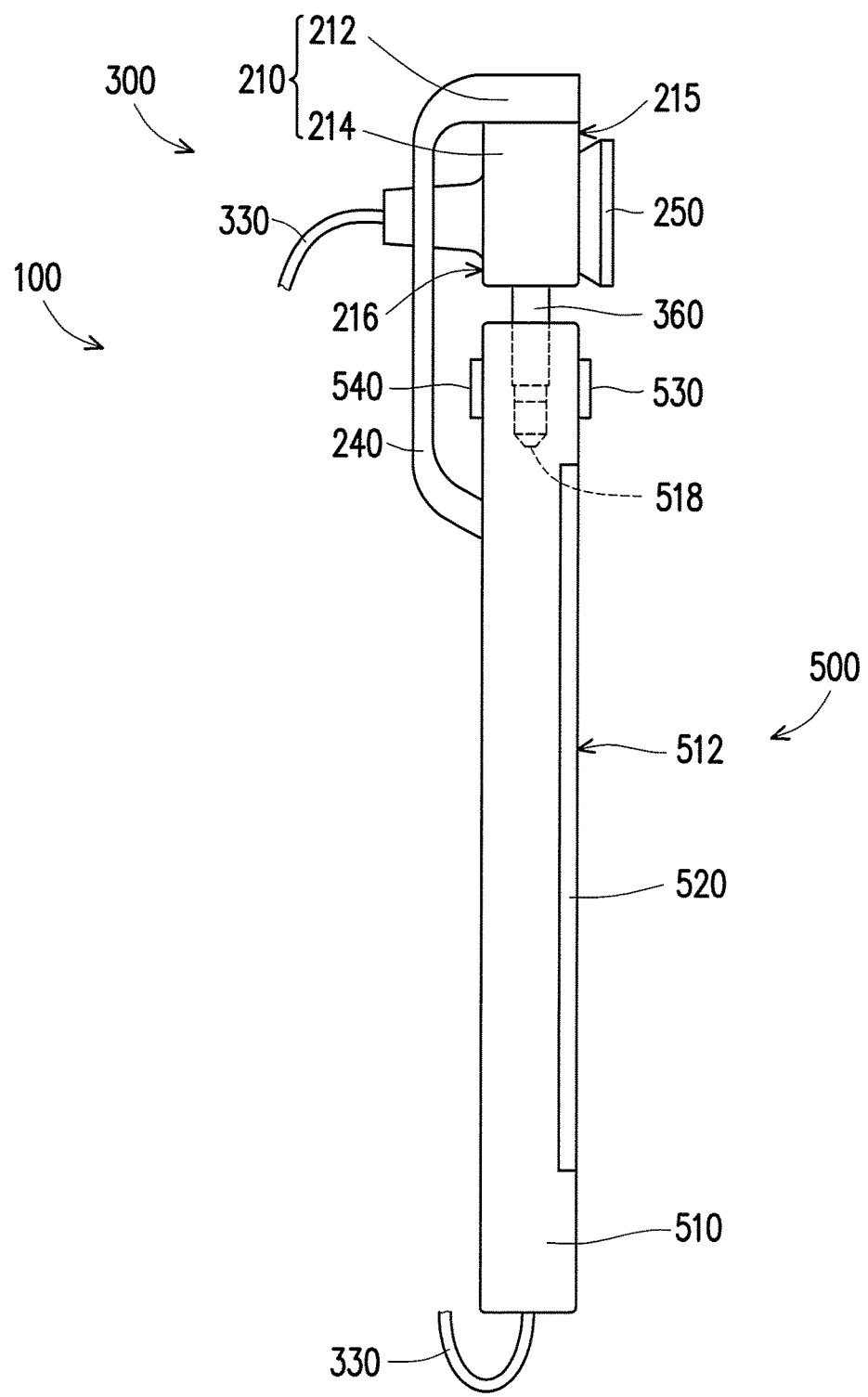

FIG. 7A and FIG. 7B are schematic diagrams illustrating implementations of an imaging system according to another embodiment of the invention. Referring to FIG. 7A and FIG. 7B, in the present embodiment, the electronic device 500 has an earphone jack 518. The fixing member 360 of the imaging device 300 can be inserted in the earphone jack 518 for detachably fixing the imaging device 300 on the device body 510 of the electronic device 500. Moreover, the imaging device 300 is signally connected to the electronic device 500 through the communication module 330 through a wired communication manner. In the present embodiment, one end of the communication module 330 connecting the electronic device 500 is, for example, inserted in the electronic device 500 through a micro USB connector. However, the connection method between the communication module 330 and the electronic device 500 is not limited by the invention.

In an embodiment of the invention that is not illustrated, the imaging device 300 of FIG. 5A can also be configured with the rotation member 270 shown in FIG. 4A and FIG. 4B, or may adopt the aforementioned two types of the touch elements 245 and 248, such that the imaging device 300 may rotate relative to the electronic device 500, and may avoid a situation that the touch element 245 or 248 interferes with the device body 510 of the electronic device 500 during the rotation process of the imaging device 300.

Figure 8:
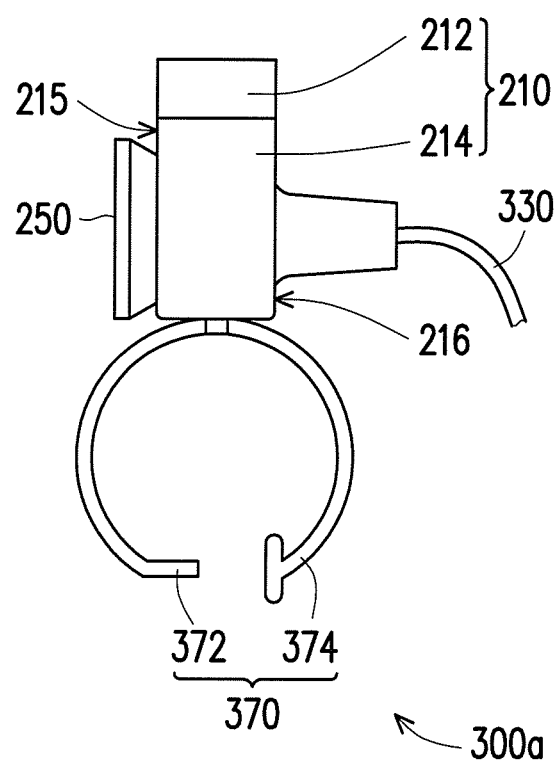
FIG. 8 is a schematic diagram of an imaging device according to another embodiment of the invention.

FIG. 8 is a schematic diagram of an imaging device according to another embodiment of the invention. Referring to FIG. 8, a difference between the imaging device 300a of the present embodiment and the imaging device 300 of FIG. 5A is that the imaging device 300a has a clamping structure 370, and the clamping structure 370 includes a fixing member 372 and a touch element 374. The fixing member 372 and the touch element 374 are commonly connected to the bottom of the shell 210, and the fixing member 372 and the touch element 374 are, for example, composed of a flexible material or a soft material. In the present embodiment, the imaging device 300a can directly clamp and fix on the electronic device 500 through the clamping structure 370. Therefore, the imaging device 300a of the present embodiment is unnecessary to be fixed on the device body 510 through the jack or connection port of the electronic device 500. Therefore, a configuration position of the imaging device 300a on the electronic device 500 is more flexible compared with configuration positions of the imaging devices 200, 200a, 200b and 300 of the aforementioned embodiments.

Since the imaging device 300a of the present embodiment is more flexible in configuration position, the imaging device 300a is easy to match various electronic devices 500 with different specifications or different lens configurations. Moreover, besides that the touch element 374 of the present embodiment can be used for contacting the sensing unit 520 serving as a touch panel, the touch element 374 can also be used as a light-shielding element, and the front lens 530 or the back lens 540 of the electronic device 500 can be used as a sensing unit of the electronic device 500. In detail, the touch element 374 can be used for contacting the front lens 530 or the back lens 540 of the electronic device 500, and meanwhile shielding or reflecting the light entering the front lens 530 or the back lens 540 of the electronic device 500, or used for shielding a proximity sensor (not shown) of the electronic device 500. The front lens 530 or the back lens 540 of the electronic device 500 has a photosensitive element (not shown), and the photosensitive element may sense an incident light coming from external, such that the front lens 530 or the back lens 540 of the electronic device 500 may serve as the sensing unit of the electronic device 500. When the touch element 374 shields the front lens 530 or the back lens 540, the photosensitive element in the front lens 530 or the back lens 540 may sense a variation of the incident light, and transmit a sensing signal to the electronic device 500 and an application thereof. Therefore, when the lens direction of the lens 222 of the imaging device 300a is the same with that of the back lens 540, i.e., the lens 222 of the imaging device 300a and the back lens 540 are all located at one side of the electronic device 500 opposite to the sensing surface 512, the touch element 374 shields the front lens 530. When the electronic device 500 determines that the front lens 530 is shielded, the electronic device 500 activates the back lens 540, and the lens 222 of the imaging device 300a and the back lens 540 commonly capture images through the dual lens manner.

When the lens direction of the lens 222 of the imaging device 300a is the same with that of the front lens 530, the touch element 374 shields the back lens 540, and the electronic device 500 activates the front lens 530, such that the lens 222 of the imaging device 300a and the front lens 530 commonly capture images through the dual lens manner.

Moreover, the touch element 374 can be used for contacting a proximity sensor of the electronic device 500, and shields a light sent by the proximity sensor, for example, an infrared light. Therefore, the electronic device 500 may determine the lens direction of the lens 222 of the imaging device 300a according to whether the proximity sensor of the electronic device 500 is shielded, so as to activate the corresponding front lens 530 or the back lens 540.

Figure 9A:
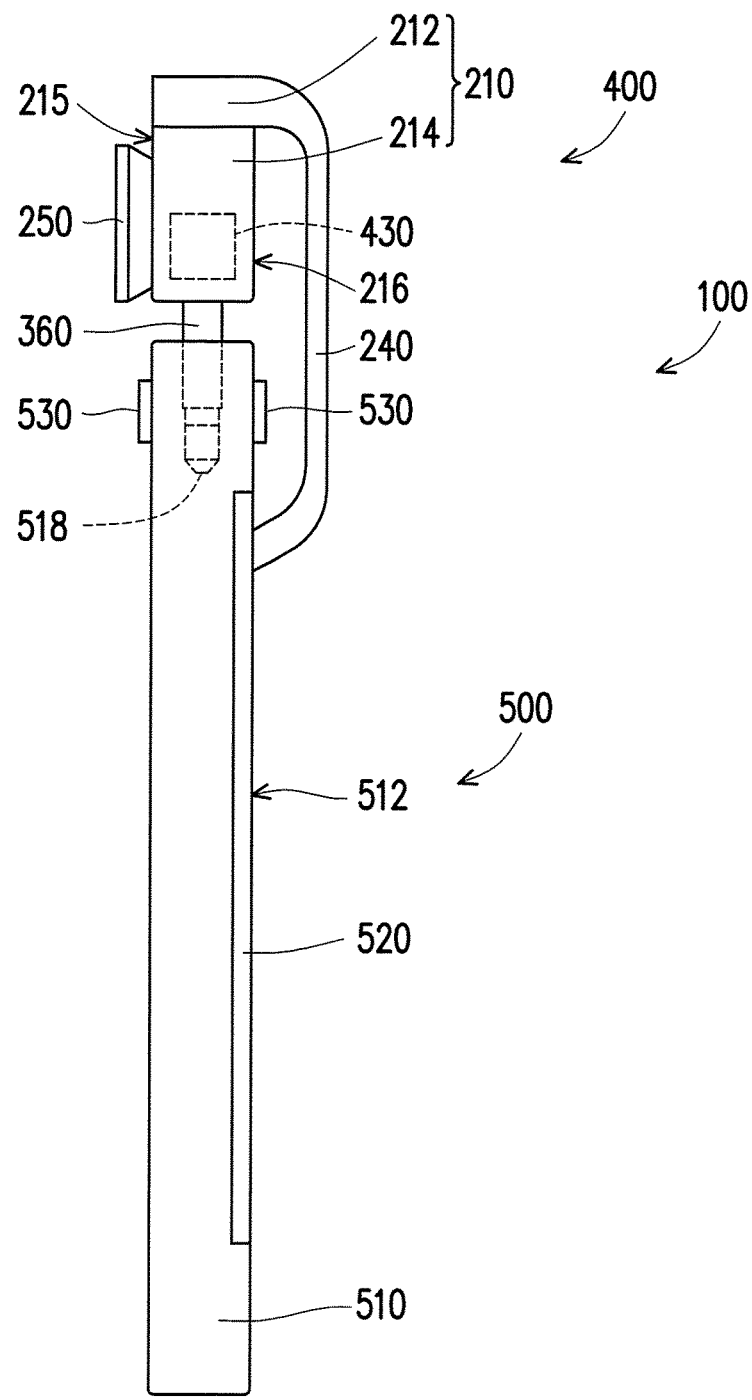
FIG. 9A and FIG. 9B are schematic diagrams illustrating implementations of an imaging system according to another embodiment of the invention.
Figure 9B:
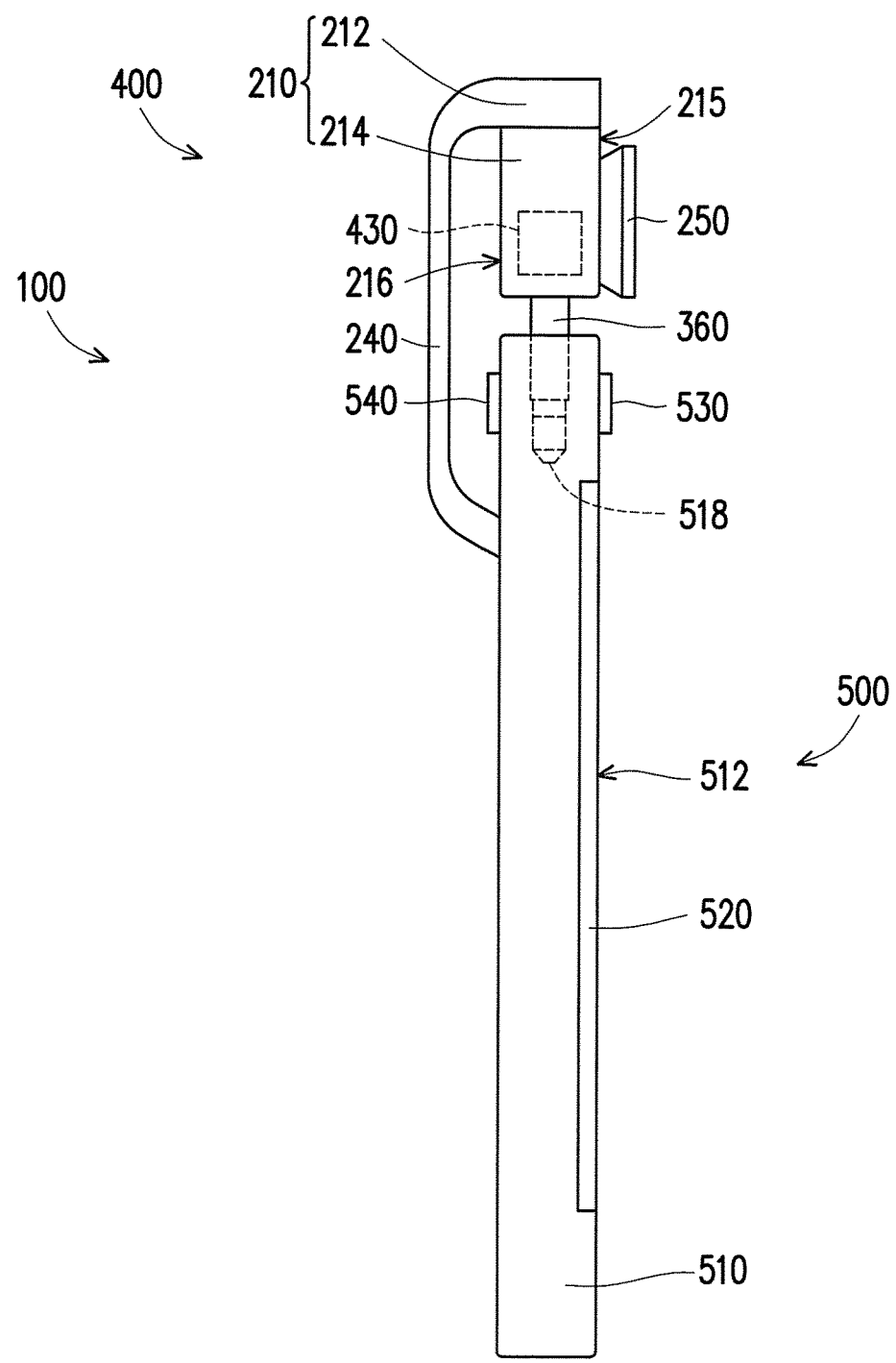

FIG. 9A and FIG. 9B are schematic diagrams illustrating implementations of an imaging system according to another embodiment of the invention. The present embodiment has a structure similar to that of the embodiment of FIG. 7A and FIG. 7B. Therefore, the same or similar components are denoted by the same or similar referential numbers, and detailed descriptions thereof are not repeated. A difference between the present embodiment and the embodiment of FIG. 7A and FIG. 7B is that the imaging device 400 has a communication module 430, and the communication module 430 is a wireless communication module. Therefore, data or signal exchange and transmission between the imaging device 400 and the electronic device 500 can be implemented through a wireless transmission manner such as bluetooth transmission or WiFi transmission, etc., and configuration of a wire or a connector between the imaging device 400 and the electronic device 500 can be omitted. For example, the imaging device 400 may directly transmit the captured images to the electronic device 500 through the wireless communication module 430.

According to the above descriptions, the imaging devices 200, 300, 400 of the aforementioned embodiments can be signally connected to the electronic device 500 through a wired or wireless manner. In other words, a most suitable signal connection method between the imaging devices 200, 300, 400 and the electronic device 500 can be selected according to an actual component configuration without being limited to a single signal connection method.

Figure 10:
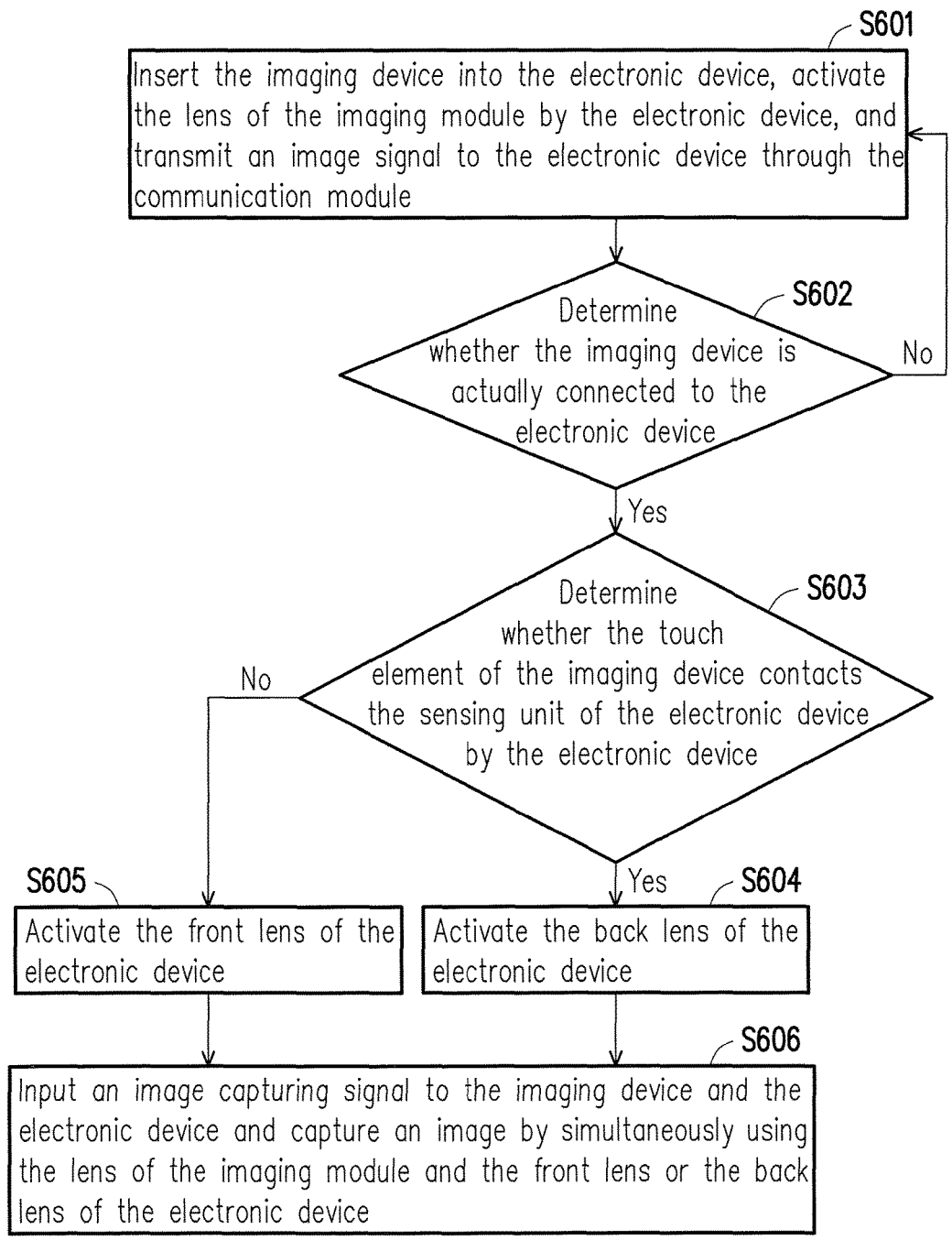
FIG. 10 is a flowchart illustrating a method for controlling an imaging system according to an embodiment of the invention.

FIG. 10 is a flowchart illustrating a method for controlling an imaging system according to an embodiment of the invention. Referring to FIG. 1A, FIG. 3A, FIG. 3B and FIG. 10, in the present embodiment, the method for controlling the imaging system 100 includes following steps. The imaging device 200 is inserted into the electronic device 500, the electronic device 500 activates the lens 222 of the imaging module 220, and the imaging device 200 transmits an image signal to the electronic device 500 through the communication module 230 (step S601). Then, the electronic device 500 determines whether the imaging device 200 is actually connected to the electronic device 500 (step S602). Thereafter, the touch element 240 of the imaging device 200 contacts the electronic device 500, and the electronic device 500 determines whether the touch element 240 contacts the sensing unit 520 (step S603). Moreover, as described above, the electronic device 500 may further determine whether a time for the touch element 240 contacting the sensing unit 520 is greater than a predetermined time set by the electronic device 500, so as to clearly distinguish a sensing signal generated due to the contact between the touch element 240 and the sensing unit 520 and a sensing signal generated due to the contact between the user's finger or stylus and the sensing unit 520.

When the touch element 240 contacts the sensing unit 520, the electronic device 500 activates the back lens 540 (step S604). Moreover, when the touch element 240 does not contact the sensing unit 520, the electronic device 500 activates the front lens 530 (step S605). In addition, the user may input an image capturing signal thought the electronic device 500, and the image capturing signal can be respectively transmitted to the lens 222 of the imaging module 220 of the imaging device 200 and the front lens 530 or the back lens 540 of the electronic device 500. Therefore, the imaging system 100 may capture images by simultaneously using the lens 222 of the imaging module 220 and the front lens 530 or simultaneously using the lens 222 of the imaging module 220 and the back lens 540 (step S606).

Figure 11:
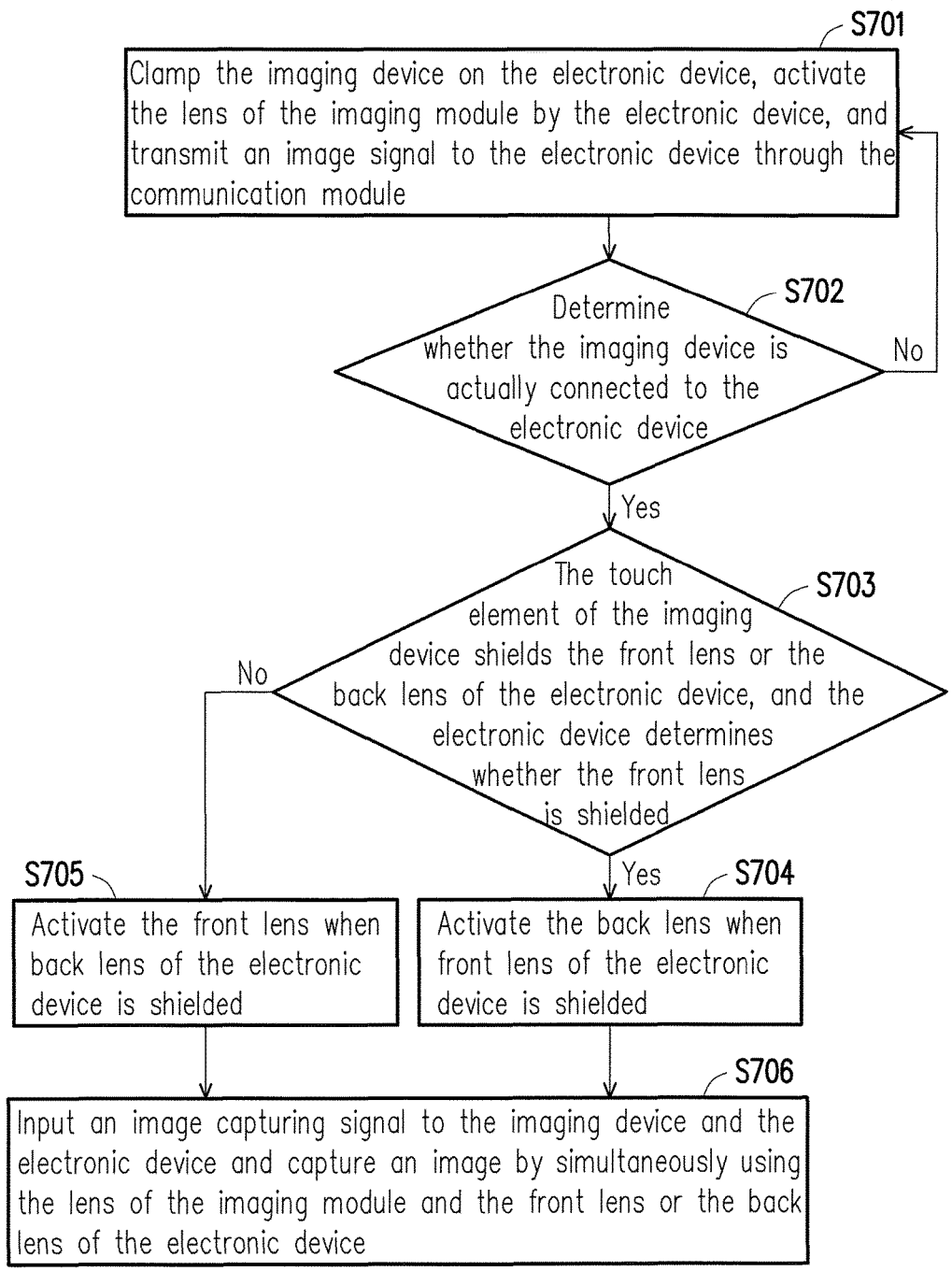
FIG. 11 is a flowchart illustrating a method for controlling an imaging system according to another embodiment of the invention.

FIG. 11 is a flowchart illustrating a method for controlling an imaging system according to another embodiment of the invention. Referring to FIG. 8 and FIG. 11, a difference between the present embodiment and the embodiment of FIG. 10 is that in the method of the present embodiment, the imaging device 300a of FIG. 8 clamps on the electronic device 500 to from the imaging system 100. In the present embodiment, the imaging device 300a has the touch element 374, and the touch element 374 can be a light-shielding element. Therefore, the method for controlling the imaging system 100 of the present embodiment includes following steps. The imaging device 300a clamps on the electronic device 500, the electronic device 500 activates the lens 222 of the imaging module 220, and the imaging device 300a transmits an image signal to the electronic device 500 through the communication module 330 (step S701). Then, the electronic device 500 determines whether the imaging device 300a is actually connected to the electronic device 500 (step S702). Thereafter, the touch element 374 of the imaging device 300a shields the front lens 530 or the back lens 540 of the electronic device 500. Meanwhile, the electronic device 500 determines whether the front lens 530 is shielded (step S703).

If the touch element 374 shields the front lens 530 of the electronic device 500, the electronic device 500 activates the back lens (step S704). If the touch element 374 shields the back lens 540 of the electronic device 500, the electronic device 500 activates the front lens 530 (step S705). Moreover, the user of the electronic device 500 may input an image capturing signal thought the electronic device 500, and the image capturing signal can be respectively transmitted to the lens 222 of the imaging module 220 of the imaging device 300a and the front lens 530 or the back lens 540 of the electronic device 500. Therefore, the imaging system 100 may capture images by simultaneously using the lens 222 of the imaging module 220 and the front lens 530 or simultaneously using the lens 222 of the imaging module 220 and the back lens 540 (step S706).

Figure 12:
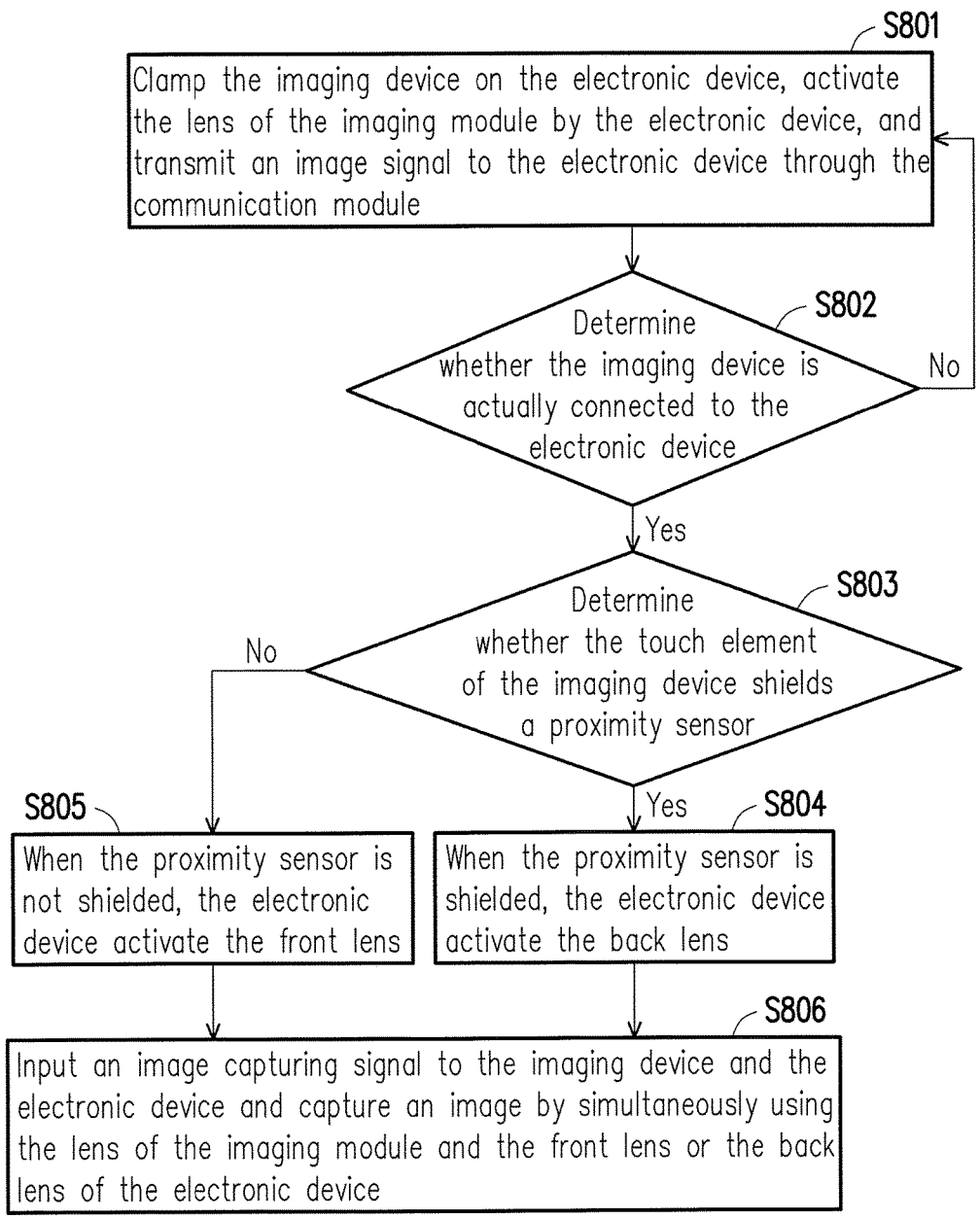
FIG. 12 is a flowchart illustrating a method for controlling an imaging system according to another embodiment of the invention.

FIG. 12 is a flowchart illustrating a method for controlling an imaging system according to another embodiment of the invention. A difference between the embodiment of FIG. 12 and the embodiment of FIG. 11 is that the sensing unit of the electronic device 500 of the present embodiment can be a proximity sensor (not shown). Therefore, besides that the touch element 374 may shield the front lens 530 or the back lens 540 of the electronic device 500, the touch element 374 may select to shield the sensing unit of the electronic device 500 to serve as a reference for determining the lens direction of the lens 222 of the imaging module 220. Referring to FIG. 12, in the present embodiment, the imaging device 300a may clamp the electronic device 500, and the electronic device 500 activates the lens 222 of the imaging module 220. The imaging device 300a transmits an image signal to the electronic device 500 through the communication module 330 (step S801). Then, the electronic device 500 determines whether the imaging device 300a is actually connected to the electronic device 500 (step S802). Thereafter, the touch element 374 of the imaging device 300a contacts and shields the proximity sensor of the electronic device 500. Meanwhile, the electronic device 500 determine lines whether the proximity sensor is shielded (step S803). When the proximity sensor is shielded, the electronic device 500 activates the back lens 540 (step S804). Moreover, when the proximity sensor is not shielded, the electronic device 500 activates the front lens 530 (step S805). Moreover, the user of the electronic device 500 may input an image capturing signal thought the electronic device 500, and the image capturing signal can be respectively transmitted to the lens 222 of the imaging module 220 of the imaging device 300a and the front lens 530 or the back lens 540 of the electronic device 500. Therefore, the imaging system 100 may capture images by simultaneously using the lens 222 of the imaging module 220 and the front lens 530 or simultaneously using the lens 222 of the imaging module 220 and the back lens 540 (step S806).

In summary, the imaging device of the invention can be disposed on the electronic device with a single lens, and the imaging device and the electronic device can be signally connected through a wired or wireless manner to form an imaging system suitable for dual lens shooting. Therefore, the electronic device with the single lens can be used in collaboration with the imaging device to implement the dual lens shooting, and it unnecessary to purchase the high price electronic device with the dual lens. Moreover, the lens direction of the imaging module of the imaging device can be adjusted though a device member for aligning with the front lens or the back lens of the electronic device, so as to improve usage flexibility of the imaging device. Moreover, according to the method for controlling the imaging system of the invention, the electronic device may automatically determine and activate the lens corresponding to the imaging device, so as to automatically capture images through the dual lens.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An imaging system, comprising:
    an electronic device, comprising:
        a device body, having a sensing surface;
        a sensing unit, disposed on the sensing surface;
        a front lens, disposed at a same side of the electronic device with the sensing surface; and
        a back lens, disposed at another side of the electronic device opposite to the sensing surface; and an imaging device, detachably disposed on the electronic device, and the imaging device comprising:
a shell, having a first surface and a second surface opposite to each other;
an imaging module, disposed in the shell and having a lens, wherein the lens is exposed on the first surface of the shell;
a communication module, disposed on the shell, and signally connected to the imaging module and the electronic device; and
a touch element, connected to the shell, and movably contacting the sensing unit,
wherein the electronic device determines whether the touch element contacts the sensing unit, and selectively activates one of the front lens and the back lens, and captures an image through the activated one of the front lens and the back lens and the lens of the imaging module.

2. The imaging system as claimed in claim 1, wherein the electronic device is a smart phone or a tablet personal computer.

3. A method for controlling an imaging device, adapted to an electronic device, wherein the electronic device has a sensing unit, a front lens and a back lens, the imaging device has an imaging module and a touch element, and the imaging module has a lens, the method for controlling the imaging device comprising:
determining whether the imaging device is connected to the electronic device;
determining whether the touch element contacts the sensing unit after the imaging device is connected to the electronic device, so as to selectively activate one of the front lens and the back lens; and
capturing an image through the activated one of the front lens and the back lens and the lens of the imaging module.

4. The method for controlling the imaging device as claimed in claim 3, wherein the sensing unit is a touch panel, the touch element is disposed on the imaging device at a side opposite to the lens of the imaging module, and the step of determining whether the touch element contacts the touch panel to selectively activate one of the front lens and the back lens comprises:
activating the back lens when the touch element contacts the touch panel; and
activating the front lens when the touch element does not contact the touch panel.

5. The method for controlling the imaging device as claimed in claim 4, further comprising:
determining whether a time for the touch element contacting the sensing unit is greater than a predetermined time set by the electronic device.

6. The method for controlling the imaging device as claimed in claim 3, wherein the sensing unit is a proximity sensor, the touch element is a light-shielding element, the touch element is disposed on the imaging device at a side opposite to the lens of the imaging module, and the step of determining whether the touch element contacts the proximity sensor to selectively activate one of the front lens and the back lens comprises:
activating the back lens when the light-shielding element shields the proximity sensor; and
activating the front lens when the light-shielding element does not shield the proximity sensor.

7. The method for controlling the imaging device as claimed in claim 3, wherein the sensing unit is the front lens or the back lens of the electronic device, and the method further comprises:
activating the back lens when the touch element shields the front lens of the electronic device; and
activating the front lens when the touch element shields the back lens of the electronic device.

8. The imaging system as claimed in claim 1, wherein an end of the communication module is signally connected to the imaging module, and another end of the communication module is signally connected to the electronic device.

9. The imaging system as claimed in claim 1, wherein the imaging device further comprises:
a fixing member, connected to the shell of the imaging device, and detachably inserted in the electronic device.

10. The imaging system as claimed in claim 1, wherein the imaging device further comprises:
a clamping structure, connected to the shell, and detachably clamping on the electronic device, wherein the clamping structure comprises the touch element and a fixing member, and the touch element and the fixing member are commonly connected to the shell.

11. The imaging system as claimed in claim 10, wherein the touch element is a light-shielding element, the sensing unit of the electronic device is a proximity sensor, and the light-shielding element is configured to shield or reflect a light entering the proximity sensor.

12. The imaging system as claimed in claim 1, wherein the imaging device further comprises:
a rotation member, disposed between the shell and the communication module, wherein the rotation member is adapted to drive the shell to rotate relative to the communication module.

13. The imaging system as claimed in claim 1, wherein the touch element comprises:
an adjusting portion, connected to the shell; and
a touch portion, wherein the touch portion movably contacts the electronic device through adjustment of the adjusting portion.

14. The imaging system as claimed in claim 13, wherein the adjusting portion is composed of a flexible material or a soft material.

15. The imaging system as claimed in claim 1, wherein the touch element comprises:
a fixed portion, a pivot portion and a pivot axis,
wherein the fixed portion is connected to the shell, and the pivot portion is pivoted to the fixed portion through the pivot axis.

16. The imaging system as claimed in claim 1, wherein the communication module has a wired communication module, and the wired communication module comprises a micro universal serial bus or a universal serial bus, and the communication module is detachably connected to the electronic device.

17. The imaging system as claimed in claim 1, wherein the communication module is a wireless communication module, and the wireless communication module comprises a WiFi communication module or a bluetooth communication module.

18. An electronic device, comprising:
a device body, having a sensing surface;
a sensing unit, disposed on the sensing surface;
a front lens, disposed at a same side of the electronic device with the sensing surface; and
a back lens, disposed at another side of the electronic device opposite to the sensing surface, wherein the electronic device selectively activates one of the front lens and the back lens according to whether the sensing unit is contacted by a touch element of an external imaging device, and captures an image through the activated one of the front lens and the back lens and a lens of the external image device.

19. The electronic device as claimed in claim 18, wherein the electronic device is a smart phone or a tablet personal computer.

20. The electronic device as claimed in claim 18, wherein the electronic device determines whether a time for the touch element contacting the sensing unit is greater than a predetermined time set, so as to determine whether the sensing unit is contacted by the touch element.

* * * * *